United States Patent [19]

Fuderer

[11] Patent Number: 4,572,829
[45] Date of Patent: Feb. 25, 1986

[54] AMMONIA SYNTHESIS GAS PURIFICATION

[75] Inventor: Andrija Fuderer, Antwerpen, Belgium

[73] Assignee: Union Carbide Corporation, Danbury, Conn.

[21] Appl. No.: 669,864

[22] Filed: Nov. 9, 1984

[51] Int. Cl.$^4$ ............................................. C01C 1/04
[52] U.S. Cl. .................................... 423/359; 252/377
[58] Field of Search ................... 423/359, 360, 361; 252/376, 377

[56] References Cited

U.S. PATENT DOCUMENTS

| | | | |
|---|---|---|---|
| 3,584,998 | 6/1971 | Green | 252/374 |
| 3,631,073 | 12/1971 | Cohn et al. | 252/373 |
| 3,885,927 | 5/1975 | Sherman et al. | 55/68 |
| 3,981,698 | 9/1976 | Leppard | 55/68 |
| 4,233,038 | 11/1980 | Tao | 55/25 |
| 4,249,915 | 2/1981 | Sircar et al. | 55/26 |
| 4,296,085 | 10/1981 | Banquy | 423/359 |
| 4,337,170 | 6/1982 | Fuderer | 252/373 |
| 4,375,363 | 3/1983 | Fuderer | 55/25 |
| 4,414,191 | 11/1983 | Fuderer | 423/359 |

OTHER PUBLICATIONS

*Oil & Gas Journal*, vol. 79, No. 18, pp. 270–280 (May 4, 1981).

Primary Examiner—John Doll
Assistant Examiner—Wayne A. Langel
Attorney, Agent, or Firm—Alvin H. Fritschler

[57] ABSTRACT

The reformed gas mixture to be employed for ammonia synthesis is purified, following shift conversion, by the selective catalytic oxidation of residual carbon monoxide and the selective adsorption of carbon dioxide and water so as to render unnecessary the methanation of carbon oxides.

6 Claims, 1 Drawing Figure

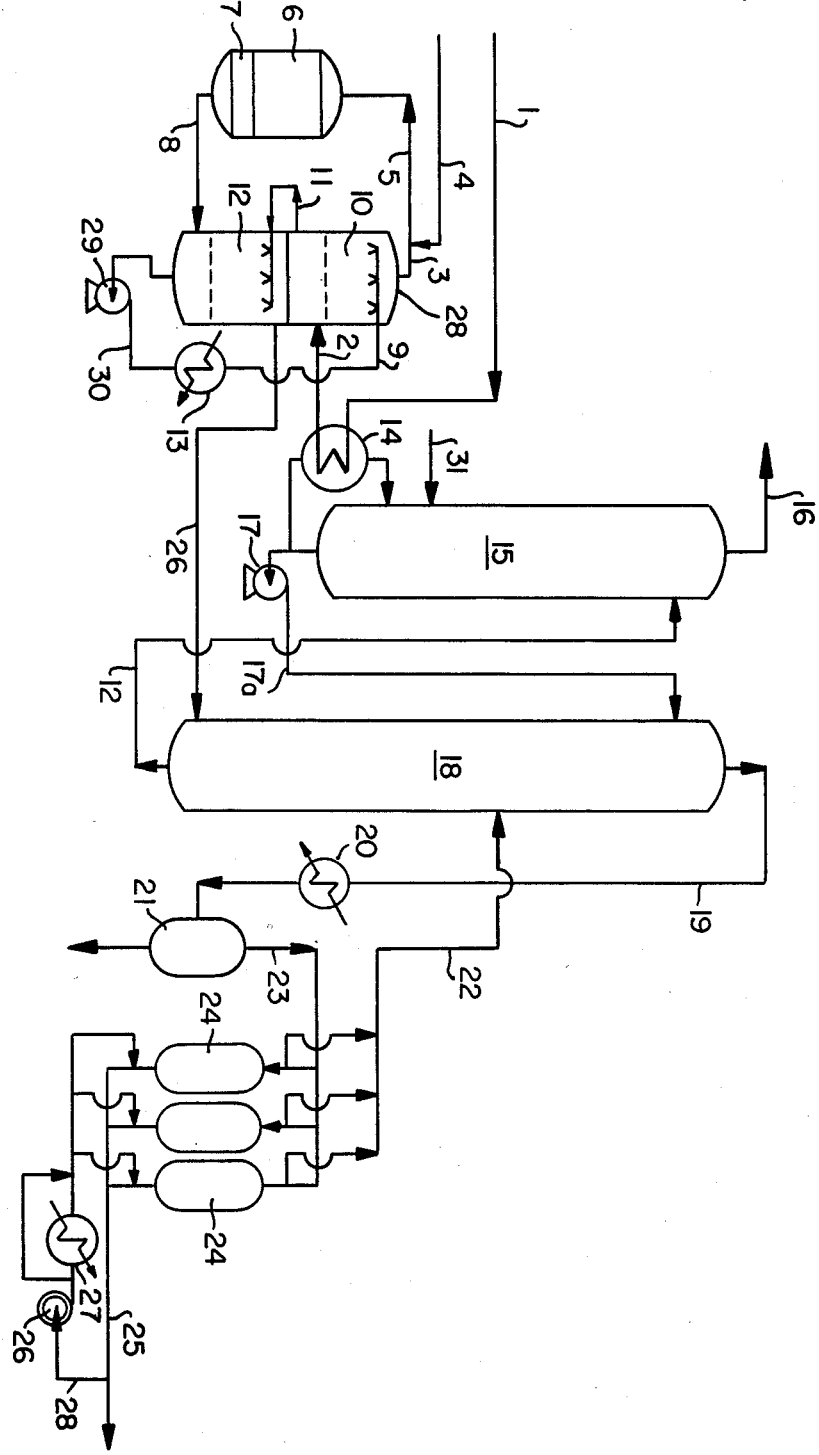

AMMONIA SYNTHESIS GAS PURIFICATION

BACKGROUND OF THE INVENTION

1. Field of the Invention

The invention relates to ammonia synthesis gas. More particularly, it relates to the purification of an ammonia synthesis gas stream.

2. Description of the Prior Art

Ammonia synthesis gas production is conventionally based on the steam reforming of natural gas or naphtha, followed by secondary reforming with air. It is also possible, however, to subject feedstocks to partial oxidation conversion, and there has been some trend toward basing commercial plants on the use of oxygen for the partial oxidation of heavier petroleum fractions and coal.

In the production of synthetic ammonia from hydrogen-nitrogen mixtures at elevated pressures, generally using iron or iron-based catalyst, the activity of the catalyst is reduced by the presence of oxygen-containing compounds. Almost invariably, the raw gas produced in the feedstock conversion operations referred to above contain such oxygen-containing compounds, namely carbon monoxide, carbon dioxide and water. Generally, raw synthesis gas purification processes thus are begun with the following two steps: (1) reaction of most of the carbon monoxide with steam for the conversion thereof to carbon dioxide and hydrogen in the so-called water gas shift conversion operation, and (2) removal of the bulk of the carbon dioxide by absorption, using suitable physical solvents, such as methanol and esters of oligoethylene glycols, or chemical-type solvents, such as hot potassium carbonate and solutions of amines. Following such treatment steps, the synthesis gas generally contains the following levels of impurities, expressed in mol percent: CO—between 0.2 and 1.0%; $H_2O$—between 0.1 and 0.2%; and $CO_2$—between 0 and 0.4%.

Further purification of said synthesis gas can be carried out employing caustic scrubbing and cryogenic techniques, generally preceded by adsorptive drying or purification techniques. A much more frequently employed technique, however, is a methanation operation, wherein the carbon oxides present in said synthesis gas react with hydrogen in accordance with the following reactions:

$$CO + 3H_2 \rightarrow CH_4 + H_2O, \text{ and} \qquad (1)$$

$$CO_2 + 4H_2 \rightarrow CH_4 + 2H_2O. \qquad (2)$$

Most of the water vapor formed is removed in the after-methanation cooler, and residual amounts of water can be separated by adsorptive drying or, as is more widely employed, in the refrigeration part of the ammonia synthesis loop where it is dissolved in liquid ammonia. The methanation operation is carried out employing nickel-based catalyst at temperatures of between 200° C. and 300° C. It has the processing advantage that both CO and $CO_2$ can be almost quantitatively reacted to form methane so that their residual concentrations are typically lower than 5 ppm.

The methanation reaction, however, also has disadvantageous features, such as the consumption of valuable hydrogen as indicated by reactions (1) and (2) above, and the formation of additional methane that accumulates in the ammonia synthesis loop as an inert gas.

Most frequently, the carbon monoxide concentration in the partly purified synthesis gas is within the range of from 0.3 to 0.6%, although it may be outside such range and typically within the broader range indicated above. It is recognized in that art that, upon completion of said water gas shift conversion, additional carbon monoxide can be removed from said synthesis by selective catalytic oxidation down to 0.01% (100 parts per million, ppm) or even lower. For this purpose, the raw gas after the shift reactions is cooled to below 80° C., preferably below 50° C., and at least as much air or oxygen is added thereto as is sufficient to react and oxidize 90–99% of the CO to $CO_2$. This reaction is carried out using catalysts that selectively and preferentially enable oxygen to react with carbon monoxide, while the rate of reaction between hydrogen and oxygen is much slower, so that very little hydrogen is oxidized. This selective oxidation of carbon monoxide enables less hydrogen to be consumed in the methanation operation, so that less raw gas is needed for the overall operation and results in less methane formation and consequently less methane accumulation in the ammonia synthesis loop. The processing sequence in said approach thus comprises: water gas shift conversion of CO with steam to form $CO_2$; conventional selective oxidation of additional CO with oxygen or air to form $CO_2$, typically reducing the CO concentration of the partially purified gas stream to below 100 ppm CO; carbon dioxide removal by liquid absorption; conventional methanation; and drying.

While such processing has desirable benefits as indicated above, there is a continuing need in the art for the development of improvements to further reduce the energy requirements and the investment costs associated with said synthesis gas production. In particular, it would be highly advantageous in the art if the hydrogen consumption in a methanator would not only be further reduced, but if the methanator could be eliminated entirely. Such elimination of the methanator would reduce the investment cost of the overall operation significantly and would also result in a desirable reduction in the process pressure drops.

It is an object of the invention, therefore, to provide an improved process for the purification of ammonia synthesis gas.

It is another object of the invention to provide an ammonia synthesis gas purification process and system in which methanation of carbon oxides becomes unnecessary.

It is a further object of the invention to provide a lower cost process and system for the purification of raw ammonia synthesis gas.

It is a further object of the invention to provide a process and system for the production of dry synthesis gas having a low methane content, whereby the energy requirements of the ammonia synthesis operation are significantly reduced.

With these and other objects in mind, the invention is hereinafter described in detail, the novel features thereof being particularly pointed out in the appended claims.

SUMMARY OF THE INVENTION

Following water gas shift conversion, particularly purified ammonia synthesis gas is treated in a selected oxidation unit to reduce the residual CO content typically to less than about 20 ppm, after which said synthesis gas is passed to a carbon dioxide removal unit and to a thermal swing adsorption system wherein water and residual amounts of carbon dioxide are removed from the gas stream. A dry synthesis gas essentially free of water and carbon oxides is thus obtained, without the necessity of providing a methanator as in conventional practice.

BRIEF DESCRIPTION OF THE DRAWING

The invention is hereinafter described in detail with reference to the accompanying single FIGURE drawing illustrating the process flow of a desirable embodiment of the invention.

DETAILED DESCRIPTION OF THE INVENTION

The objects of the invention are accomplished by the novel combination of two gas purification techniques, namely the selective oxidation of CO to residual levels lower than are conventionally employed and the use of thermal swing adsorption to remove residual amounts of CO and $CO_2$ and water. As a result, a purified ammonia synthesis gas, preferably containing less than a total 10 ppm of carbon oxides, i.e. CO and $CO_2$, can be obtained without resort to methanation.

In the practice of the invention, raw ammonia synthesis gas may be purified using a processing sequence comprising: water gas shift conversion of CO and steam to form $CO_2$; selective oxidation of additional CO to reduce the CO content of the partially purified gas stream to very low levels; liquid absorption of $CO_2$; and adsorption of residual $CO_2$, CO and water by thermal swing adsorption techniques. As the partially purified ammonia synthesis gas typically contains only between from about 200 to about 2,000 ppm $CO_2$, i.e. about 0.02 to about 0.2 mol % $CO_2$, it will be appreciated that the molecular sieve adsorbent beds employed in the thermal swing adsorption system can advantageously be minimized. More importantly, the hot gas purge rate for the desorption of CO, $CO_2$ and water in the thermal swing adsorption system is found to be about proportional to the size of the adsorbent bed, with only about 12-20% of the purified product gas being recycled as purge gas for the regeneration of the adsorbent bed and passage to the liquid absorption step for removal of residual amounts of $CO_2$.

In the practice of the invention, i.e. in the absence of a methanator, selective oxidation of CO is carried out with oxygen or air so as to achieve a very low residual CO concentration in the synthesis gas being treated, typically to from about 0 to about 20 ppm, preferably less than about 10 ppm. For this purpose, the established commercial Selectoxo process of Engelhard Industries is conventionally employed, although other such processes capable of selectively reacting carbon monoxide with oxygen in the presence of hydrogen may also be employed. Details concerning the Selectoxo process are set forth in the Cohn patents, U.S. Pat. No. 3,216,782; 3,216,783; and 3,631,073, incorporated in the entirety herein by reference. While this selective CO oxidation process has heretofore been commonly employed to reduce the CO concentration to about 100 ppm, excess oxygen or air is generally needed to achieve the low CO concentrations desired in the practice of the invention. The stoichiometric requirement is one mol of oxygen of each two moles of CO. For CO removal below 10 ppm, between 5 and 20% excess oxygen is generally required. Furthermore, a somewhat larger catalytic bed than would otherwise be employed will generally be utilized, or two or more beds in series will be employed. The excess oxygen added to achieve a low residual concentration of carbon monoxide is subsequently removed since it would otherwise tend to deactivate the ammonia synthesis catalyst. For this purpose, another small catalyst bed suitable for reacting oxygen with hydrogen may be employed. The so-called deoxo catalysts employed for this purpose contain platinum and/or palladium and are well known and frequently employed for the removal of trace amounts of oxygen from gas streams. The deoxo catalyst can be placed in a separate vessel or in the same vessel, but downstream of the catalyst for the selective oxidation of carbon monoxide. Such removal of excess oxygen, e.g. to a residual oxygen level of less than about 3 ppm, does not consume a significant amount of the hydrogen being purified.

Following selective oxidation of the CO content of the synthesis gas to $CO_2$ such that very low residual levels of CO pertain, it will be appreciated that carbon dioxide and water remain to be removed therefrom by adsorption on molecular sieves on other suitable adsorbents. Prior to such adsorption, however, bulk carbon dioxide removal is accomplished by a conventional liquid absorption operation. Thus, the partially-treated synthesis gas stream is passed to a carbon dioxide scrubbing zone for removal of a major portion of the carbon dioxide content, as indicated above, so that the bulk of said $CO_2$ content need not be removed in the adsorbent beds used for thermal swing adsorption that constitutes the final purification step of the invention. The carbon dioxide scrubbing step can be carried out using any known, commercially available scrubbing techniques and liquid scrubbing materials. The Benfield aqueous alkaline scrubbing process, the Shell Sulfinol and the Allied Chemical Selexol solvent extraction processes are examples of commercial techniques for removing carbon dioxide from gas streams that are useful in the practice of the invention.

Final purification of the synthesis gas stream by removing residual amounts of carbon dioxide and water as well as carbon monoxide therefrom conveniently achieved in a thermal swing adsorption system, without the need for employing a methanator to achieve the desired level of purification, as down to a total of less than about 10 ppm of carbon oxides. For this purpose, the gas being treated is passed to a thermal swing adsorption system having at least two adsorbent beds, preferably three or more such adsorbent beds, operated on a cyclic basis as is well known in the art, with the desorptive regeneration of the adsorbent being carried out at essentially the adsorption pressure level. When a bed has received synthesis gas being treated to the point at which it is substantially loaded with water and $CO_2$, it is switched to a heating or regeneration step in which hot purge gas typically at a temperature lower than 350° C. is employed. During this heating step, the adsorbent is typically heated and purged countercurrently with a portion of the purified synthesis gas. In one embodiment of the thermal swing adsorption approach, cooling of the adsorbent bed may be commenced after, for example, 70% of the bed has been heated. During this cooling, the heat front in the bed moves out from the feed end of the bed, thus completing the desorption of water and $CO_2$ therefrom. This so-called thermal pulse type regeneration will be understood to comprise only one processing alternative. Another approach is to introduce the cold gas to be treated to a hot bed and, while the bed is cooled, the hot effluent therefrom is further heated and introduced to the next bed, which is being heated. This approach is known as heating and cooling in series. It will be appreciated that, of itself, thermal swing adsorption is well known in the art is as will be evidenced by the disclosures of the Sircar et al. patent, U.S. Pat. No. 4,249,915; the Tao patent, U.S. Pat. No. 4,233,038; the Leppard patent, U.S. Pat. No. 3,981,698; and Sherman et al. patent, U.S. Pat. No. 3,885,927.

With reference to the drawing for a further understanding of the invention comprising such a combination of processing steps, numeral 1 refers to a feed line for hot feed gas, which may contain 15–25 mol % $CO_2$, said hot gas being cooled to about 120° C. upon passage through reboiler 14 of stripping column 15. The partially cooled gas is passed in line 2 to direct contact cooler 10, in which it is cooled with circulated water in line 9 so as to leave the top of said cooler 10 at about 50° C. through line 3. An additional indirect cooler may be used, if desired, to cool said gas in line 3 further. Said cooled gas in line 3 is thoroughly mixed with compressed air from line 4 in line 5, and is then introduced to selective catalyst bed 6, wherein carbon monoxide present therein is selectively oxidized to $CO_2$. Excess oxygen present in the gas is subsequently reacted with hydrogen on deoxo catalyst bed 7, and an effluent gas containing desirably less than 10 ppm carbon monoxide and less than 2 ppm oxygen is then passed in conduit 8 to direct heater-saturator 12, wherein it contracts water introduced through line 11. Saturated gas at 100° C. is passed from said heater-saturator 12 through conduit 26 to $CO_2$ adsorption column 18, wherein it is contacted with lean potassium carbonate or other absorbent solution pumped to the upper part of said column 18 by pump 17 and line 17a. Water is pumped from said heater-saturator 12 by means of pump 29 and line 30 to cooler 13, where it is cooled to 40° C., before being passed in conduit 9 to direct contact cooler 10.

In absorber column 18, carbon dioxide is absorbed into the potassium carbonate solution, and the resulting rich solution is passed through line 12 to stripping column 15 for regeneration therein. Stripped $CO_2$ together with some steam leaves column 15 as stream 16 at the top of said column. If desired, some water may be pumped to the top of absorber column 18 and stripper column 15 to wash the overhead gas from entrained solvent. The washed gas in line 19, having its $CO_2$ content reduced to about 0.1 mol %, is cooled in product cooler 20 and, after passage through knock-out separator 21, is passed in line 23 to thermal swing adsorption system 24, comprising three adsorbent beds in the illustrated embodiments.

Purified synthesis gas product is withdrawn from adsorption system 24 through conduit 25, with the portion thereof recycled for bed regeneration purposes passing through line 28 and process blower 26 and heater 27 for such recycle to the bed undergoing regeneration as described above. The effluent gas containing desorbed carbon dioxide is passed through conduit 22 to absorption column 18. Since the effluent gas contains on the average only some 0.5 to 1.6 mol % $CO_2$, it is not desirably mixed with the main feed stream in conduit 26, as this would reduce the partial pressure of $CO_2$ in the feed gas, and the solvent loading with $CO_2$ and, consequently, would result in the necessity for increasing the solvent circulation employed in the system. If, as shown in the drawing, the effluent gas is introduced at a higher point on the adsorption column where the gas phase $CO_2$ concentration is between 0.5 and 3 mol %, the necessary increase in solvent circulation rate becomes small.

It will be appreciated that the process of the invention as described with reference to the drawing represents only one embodiment of the invention practiced with the use of a solvent of the hot potassium carbonate type. If, for example, selective oxidation reactor 6 were moved downstream of absorption column 18, as between knock-out separator 21 and adsorbent beds 24, the direct contact cooler 10 and saturator 12, as well as the water recirculation pump, becomes unnecessary, and the gas being treated can be passed from conduit 2 directly through conduit 26 to absorption column 18. If other solvents are employed such that absorption column 18 is operated below 50° C., cooler 10 and saturator 12 can also be substituted for by one indirect cooler. It will also be appreciated that two reactors 6 may be provided for selective oxidation, so that one that is deactivated is periodically regenerated, while the other is placed in stream after having been regenerated.

It should be noted that absorber column 18 and stripping column 15 may also be operated with other chemical solvents, such as ethanolamines or physical-type solvents, and the stripping action may be accomplished with nirogen introduced to column 15 through conduit 31 instead of with steam. It will be appreciated, however, that all such processing alternatives necessary include the combination of the selective oxidation of CO on catalyst bed 6 and the selective adsorption of residual $CO_2$ on the beds of thermal adsorption system 24, such that the methanation operation of the prior art is rendered unnecessary.

In the practice of the invention, the raw synthesis gas is subject to water gas shift conversion to convert carbon monoxide present therein to hydrogen and carbon dioxide prior to the novel combination of processing steps described above for the further purification of said synthesis gas stream. For this purpose, the synthesis gas mixture is commonly passed to a conventional water gas shift until, typically at 300–400° C., for high temperature shift in the presence of known, commercially available chromium-based water gas shift catalyst. Low temperature shift, also known in the art, may be employed following said high temperature shift conversion. Low temperature shift is generally carried out at a temperature on the order of about 250° C. in the presence of known, commercially available copper-based water gas shift catalysts. The carrying out of low temperature shift conversion upon completion of high temperature shift in order to achieve more complete shift conversion, while necessary in some commercial processes, is not essential for purposes of the invention. In preferred embodiments of the invention, therefore, shift conversion consists of higher temperature shift only, without resort to subsequent low temperature shift conversion. In any event, most of the carbon monoxide present in the reformed gas mixture, e.g. more than 80%, typically from about 85% to 98%, of the CO content of said reformed gas mixture will generally be converted in the water gas shift conversion operation.

Following such shift conversion in an illustrative example of the practice of the invention, the reformed gas mixture has the following composition in mol %: 73.8% hydrogen, 0.24% nitrogen, 0.3% methane, 0.4% argon, 0.3% CO, 0.1% $CO_2$ and 0.1% water. To 5,000 moles of this gas, 40 moles of air containing 8.25 moles of oxygen and 31.4 moles of nitrogen is added. The combined stream will first react oxygen with essentially all of the carbon monoxide on the selective oxidation catalyst, with any remaining oxygen being subsequently reacted with small amounts of hydrogen on the deoxo catalyst. In this manner, 7.5 moles of oxygen is reacted with CO, and 0.75 moles of oxygen is reacted with 1.5 moles of hydrogen. Thus, only a small amount of hydrogen is consumed, and the gas composition following selective oxidation is as follows in mol %: 74.05% hydrogen, 24.72% nitrogen, 0.3% methane, 0.4% argon, 0.4% $CO_2$ and 0.13% water. The temperature of this gas is about 65° C., and it is preferably cooled to 40° C. or lower before it is passed to a water knock-out drum and to an adsorbent bed containing conventional 4A, 5A or 13X type molecular sieves or other suitable adsorbents for the essentially complete removal of water and $CO_2$ therefrom. The resulting synthesis gas product contains preferably less than a total of 10 ppm of carbon oxides, oxygen and water, as for example, 5 ppm of CO and 1 ppm each of $CO_2$, oxygen and water. In this example, the synthesis gas would also contain a total of 0.7 mol % of inert gases, argon and methane. If the partially purified synthesis gas had been passed to a methanation reactor as described above, on the other hand, reactions (1) and (2) would have consumed 45 moles of hydrogen for the methanation of carbon monoxide and 20 moles of hydrogen for the methanation of carbon dioxide. Thus, a total of 65 moles of hydrogen, which is 40 times more than the hydrogen that reacted with excess oxygen in the illustrative example of the practice of the invention, would have been consumed. In addition in the the practice of the methanation approach, the synthesis gas would have been wet, and it would have contained more inert gases than is the case in the practice of the invention, i.e. 1.1 mol % of methane and argon instead of 0.7 mol %. In a 1,000 metric tons per day ammonia plant, this difference in synthesis gas quality would result in an additional power requirement of about 1,000 kw for the methanation approach over and above the requirements for the invention. Alternatively, with a conventional processing sequence of shift-selective oxidation-liquid absorption of $CO_2$-methanation, 20 Kg moles of hydrogen would be consumed for the methanation of the residual carbon dioxide and about 1 kg mol for the methanation of carbon monoxide. The resulting synthesis gas would be wet and would contain 0.81% inerts, argon and methane. In addition to the advantages of the invention as indicated above with respect to this illustrative example, it should be noted that the investment for the adsorptive removal of carbon dioxide is several times lower than the investment requirement for the methanation step, and there is further cost savings in the ammonia synthesis loop because of the dry, lower inert-containing synthesis gas produced in the practice of the invention.

As described above, the invention can be practiced using a processing sequence comprising (A) shift-selective oxidation of CO-liquid absorption of $CO_2$-adsorption of $CO_2$, or (B) shift-liquid absorption of $CO_2$-selective oxidation of CO-adsorption of $CO_2$. It will be appreciated that each processing option has certain advantages. Thus in the case of option A, the feed gas to the adsorbent beds contains only between 200 and 2,000 ppm, i.e. 0.02-0.2 mol %, of $CO_2$. The molecular sieve beds used in the adsorbent beds for $CO_2$ removal can thus be smaller than is the case for option B. More importantly, the hot gas purge rate for the desorption of $CO_2$ and water is proportional to the size of the adsorbent bed. As a result, only about 12-20% of the purified product generally needs to be used for the adsorbent bed regeneration operation and recycle to the liquid absorption column.

The advantage of the option B approach, on the other hand, resides in the lower carbon dioxide concentration, lower molecular weight and lower mass flow rate of gas through the selective oxidation portion of the process and system of the invention. Option B is also more readily adaptable to liquid absorption processes of the hot potassium carbonate type, such as the Benfield process. Typically, the shifted gas is cooled to between 70° C. and 130° C., e.g., 80°-120° C., and enters the absorber column preferably at this temperature and saturated with water. No further heating or cooling is required, and only the washed product gas is cooled to about 50° C. before it is passed to the selective oxidation reactor wherein CO is oxidized to $CO_2$.

A comparative disadvantage of option B is that the gas passed to the molecular sieve adsorbent bed contains more carbon dioxide, typically between 0.3 and 0.6 mol %, so that larger beds are required. In addition, the purge gas rate required to heat and cool the beds and to desorb $CO_2$ and water, is higher. Typically, between 20 and 32% of the purified product gas is used for regeneration and recycled to the $CO_2$ wash column in the practice of option B. The energy requirements of this recycle are not very high since the regenerative heating and cooling is done essentially at the same pressure as the adsorption and the recycle blower has to overcome only the pressure drop in the process apparatus. If the gas is dried first in one adsorbent bed, e.g., using silica gel or molecular sieves, and a separate molecular sieve bed is used for the removal of carbon dioxide, the regeneration gas rate can be optimized for each adsorbent bed, and the overall gas rate, and specially the gas rate recycled to the liquid absorption column, can be significantly further reduced to below 10% of the purified gas flow rate.

Those skilled in the art will appreciate that option A is generally more advantageous for liquid absorption processes operating typically at temperatures below 50° C., while option B is generally more suitable in combination with hot carbonate type liquid absorption processes that typically operate above 80° C. Both options can, however, be applied in conjunction with any type of $CO_2$ wash liquid absorption process. If the processing sequence of option A is applied using the hot carbonate type process, additional cooling and heating steps will desirably be employed so that the complete sequence might, for example, comprise: shift, cooling from 115° C. to 50° C., selective oxidation—heating to 100° C., liquid absorption, overhead product cooling, adsorptive removal of water and $CO_2$—recycle of adsorbent bed regeneration gas to the liquid absorption column. The cooling to 50° C. and the heating back to 100° C. after the selective oxidation of CO can be achieved without any addition of external heat in relatively low cost direct contact heaters and coolers, where circulating water is cooling the gas in one vessel with suitable packings and re-heating the gas in the other. Simultaneously, with heating by direct contact with water, the gas is also saturated with water. A saturated feed gas at around 100° C. fits closely the most advantageous conditions for a hot potassium carbonate type absorption column.

Apart from the particulars of specific processing alternatives, the invention will be seen to reside in the advantageous combination of the selective oxidation of residual CO in a reformed gas mixture, following shift conversion, to $CO_2$, and the removal of residual $CO_2$ and water by thermal swing adsorption. By eliminating the need for employing methanation, the invention provides a significant advance in the field of ammonia synthesis gas purification. The elimination of the conventionally employed methanator will be seen not only to reduce investment costs and energy requirements, but will enhance the utilization of hydrogen and the overall efficiency of the desired ammonia synthesis gas purification operation.

I claim:

1. In the purification of a reformed gas mixture following water gas shift conversion to produce a purified ammonia synthesis gas stream, the improved processing sequence consisting essentially of:
  (a) selectively catalytically oxidizing the residual carbon monoxide content of said gas mixture to carbon dioxide so as to reduce the carbon monoxide content of said gas mixture to less than about 20 ppm, said selective catalytic oxidation being carried out with an excess of air, with said excess oxygen being catalytically reacted with a small amount of hydrogen so that the residual oxygen level is reduced to less than about 3 ppm;
  (b) removing the bulk of the carbon dioxide content of said gas mixture by liquid absorption;
  (c) removing residual amounts of carbon monoxide, carbon dioxide and water by selective adsorption on the fixed beds of a thermal swing adsorption system, a dry, purified ammonia synthesis gas stream containing less than a total of 10 ppm of carbon monoxide and carbon dioxide being recovered from said thermal swing adsorption system;
  (d) passing the resulting dry, purified ammonia synthesis gas stream having a low content of methane to an ammonia production operation without intermediate passage of said ammonia synthesis gas stream to a methanation unit or to a cryogenic unit for removal of carbon monoxide and carbon dioxide therefrom;
  whereby the efficiency of the overall purification operation and the effective utilization of hydrogen are enhanced.

2. The process of claim 1 in which said selective catalytic oxidation of CO is carried out with an excess of oxygen of between 5 and 20%, said residual carbon monoxide content being reduced to less than about 10 ppm.

3. The process of claim 1 in which bulk carbon dioxide removal is carried out using a hot potassium carbonate solution in water, at a temperature of from about 70° C. to about 130° C.

4. The process of claim 1 in which said adsorbent beds contain molecular sieves capable of selectively adsorbing carbon dioxide from the partially purified reformed gas mixture passing therethrough.

5. The process of claim 1 and including the desorptive regeneration of the adsorbent at essentially the same pressure as the adsorption pressure, employing hot purge gas having a temperature lower than 350° C.

6. The process of claim 5 in which the desorption purge effluent gas is passed to the liquid absorption column.

* * * * *